(12) United States Patent
Imura

(10) Patent No.: US 7,006,690 B1
(45) Date of Patent: Feb. 28, 2006

(54) TEST CHART COLOR MEASURING SYSTEM AND A COLOR OUTPUT APPARATUS CORRECTING SYSTEM

(75) Inventor: Kenji Imura, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 827 days.

(21) Appl. No.: 09/668,174

(22) Filed: Sep. 25, 2000

(30) Foreign Application Priority Data

Sep. 30, 1999 (JP) .................................. 11-278545

(51) Int. Cl.
*G06K 9/00* (2006.01)
(52) U.S. Cl. ..................................................... 382/167
(58) Field of Classification Search ........ 356/400–405; 382/162–167; 358/504–523
See application file for complete search history.

(56) References Cited

U.S. PATENT DOCUMENTS

| | | | |
|---|---|---|---|
| 4,773,761 A | | 9/1988 | Sugiyama et al. |
| 5,416,613 A | * | 5/1995 | Rolleston et al. ........... 358/518 |
| 5,483,339 A | * | 1/1996 | Van Aken et al. ........... 356/326 |
| 5,691,817 A | * | 11/1997 | Cargill et al. ................ 356/405 |
| 5,963,334 A | * | 10/1999 | Yamaguchi et al. ......... 356/405 |
| 6,008,905 A | * | 12/1999 | Breton et al. ................ 356/405 |
| 6,538,242 B1 | * | 3/2003 | Kuno et al. .............. 258/208.1 |

FOREIGN PATENT DOCUMENTS

| | | | |
|---|---|---|---|
| JP | 6-152941 | | 5/1994 |
| JP | 10-142500 A | * | 5/1998 |
| JP | 11-258712 A | * | 9/1999 |

\* cited by examiner

*Primary Examiner*—Jingge Wu
(74) *Attorney, Agent, or Firm*—McDermott Will & Emery LLP

(57) ABSTRACT

A color measuring head is provided with an illuminating unit, a light receiving optical system, a color image pickup unit, a drive controller and a measurement controller, and picks up an image of a test chart as a measurement specimen placed to face a specimen opening. A personal computer is provided with a monitor, a memory unit, and a CPU. The CPU calculates color values of color samples by reading and implementing a control program stored in the memory unit. The color of the test chart in which a plurality of color samples are arrayed can be automatically measured within a short period of time.

30 Claims, 10 Drawing Sheets

TEST CHART COLOR MEASURING SYSTEM AND A COLOR OUTPUT APPARATUS CORRECTING SYSTEM

This application is based on patent application No. 11-278545 filed in Japan, the contents of which are hereby incorporated by references.

BACKGROUND OF THE INVENTION

This invention relates to techniques concerning measurement of a test chart used to correct output colors of a color output apparatus such as color printer or color copier and correction of the output colors using a color measurement result.

Generally, output colors of a color output apparatus such color printer or color copier slightly vary due to environmental factors such as temperature and humidity and with the lapse of time even within one day. Particularly, the output colors are corrected once or more within one day in a color output apparatus used as a small-sized printing apparatus. A test chart in which a plurality of color samples having different tones and different densities are arrayed is used for the correction of the output colors. Specified control information is sent from, for example, a personal computer to a color output apparatus as an, object to be corrected, the color output apparatus is caused to output a test chart used for the correction, and output colors are corrected based on differences between the measurement results and color values the respective color samples should have.

It takes a long time if the colors of the test chart are measured for each color sample using a usual manually operable colorimeter. Accordingly, linear scan type colorimeters in which a single color measuring sensor is moved in one direction and two-dimensional scan type colorimeters in which this color measuring sensor is moved in vertical and horizontal directions have been used.

For the colorimeter of the former type, a strip-shaped test chart in which color samples having different tones are arranged in a plurality of rows and densities thereof gradually change between the rows as shown in FIG. 16 is used. Color measurement data of the respective color samples are obtained by causing the color measuring sensor to longitudinally scan the test chart.

On the other hand, for the calorimeter of the latter type, a test chart in which a much greater number of color samples than the test chart for the linear scan type colorimeter are two-dimensionally arrayed as shown in FIG. 17. Color measurement data of the respective color samples are obtained by causing the color measuring sensor to longitudinally and laterally scan the test chart.

Since the conventional linear scan type colorimeter needs to scan each row of the test chart for the color measurement, a manual operation to change the row to be scanned is necessary. This results in a poor operability. On the other hand, the two-dimensional scan type colorimeter does not require the row to be scanned to be manually changed unlike the conventional linear scan type colorimeter and, accordingly, measurement can be completely automated. Thus, a test chart in which a larger number of color samples are two-dimensionally arrayed can be used. However, such a test chart is expensive to manufacture and is disadvantageous in terms of costs.

Further, since either colorimeter is of the scan type, the more the color samples, the longer time is required for the color measurement. Further, since the color measuring sensor is driven to scan, scanning precision and a dimensional reproducibility of the test chart need to be considered in order to precisely extract adjacent color samples. Such considerations lead to increased costs.

SUMMARY OF THE INVENTION

It is an object of the present invention to provide a test chart color measuring system and a color output apparatus correcting system which are free from the problems residing in the prior art.

According to an aspect of the present invention, a test chart color measuring system comprises a color image taking apparatus for taking up a color image of a test chart in which specified color samples are respectively arrayed in sections divided in a matrix manner to output image signals of a plurality of color components and, an image processor for extracting image signals corresponding to color samples and calculating a color value of each color sample using the extracted image signal. The extraction of image signals is performed based on the density of the taken test chart image, or based on the taken test chart image and information on section division. Alternatively, it may be possible to use a test chart provided with a marker indicating a boundary of sections. In this case, the image processor extracts image signals corresponding to color samples based on markers in the taken test chart image, and calculates a color value of each color sample using the extracted image signal.

According to another aspect of the present invention, a system for correcting a color output apparatus, comprises the above-mentioned inventive test chart color measuring system. The correcting system is further provided with a test chart output controller for controlling a color output apparatus to output a test chart for correction in which specified color samples are respectively arrayed in sections divided in a matrix manner, and a correction data calculator for calculating correction data for the color output apparatus based on respective color values of the color samples.

These and other objects, features and advantages of the present invention will become more apparent upon a reading of the following detailed description and accompanying drawings.

BRIEF DESCRIPTION OF THE DRAWINGS

FIGS. 14A and 14B show a modification of the color measuring head, wherein FIG. 14A is a plan view of a modified illuminating unit when viewed from a side of a light source, and FIG. 14B is a side view showing the modified illuminating unit, a light receiving optical system and an image pickup unit when viewed from the bottom of FIG. 14A;

DETAILED DESCRIPTION OF THE PREFERRED EMBODIMENTS OF THE INVENTION

Figure 1A:
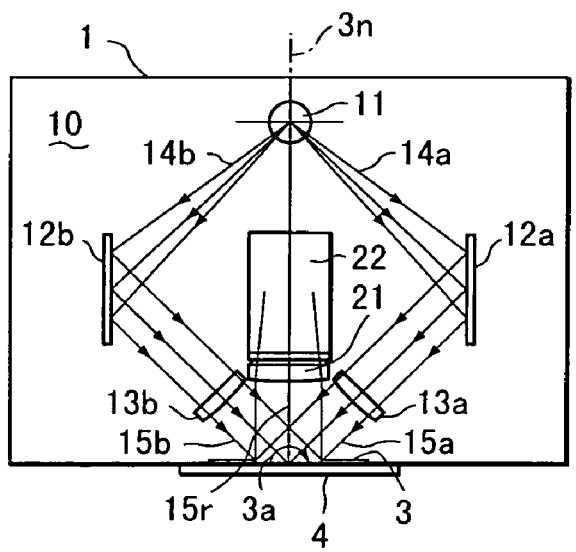
FIG. 1A is a diagram showing a test chart color measuring system according to an embodiment of the invention, an illuminating unit provided in the system being shown.
Figure 1B:
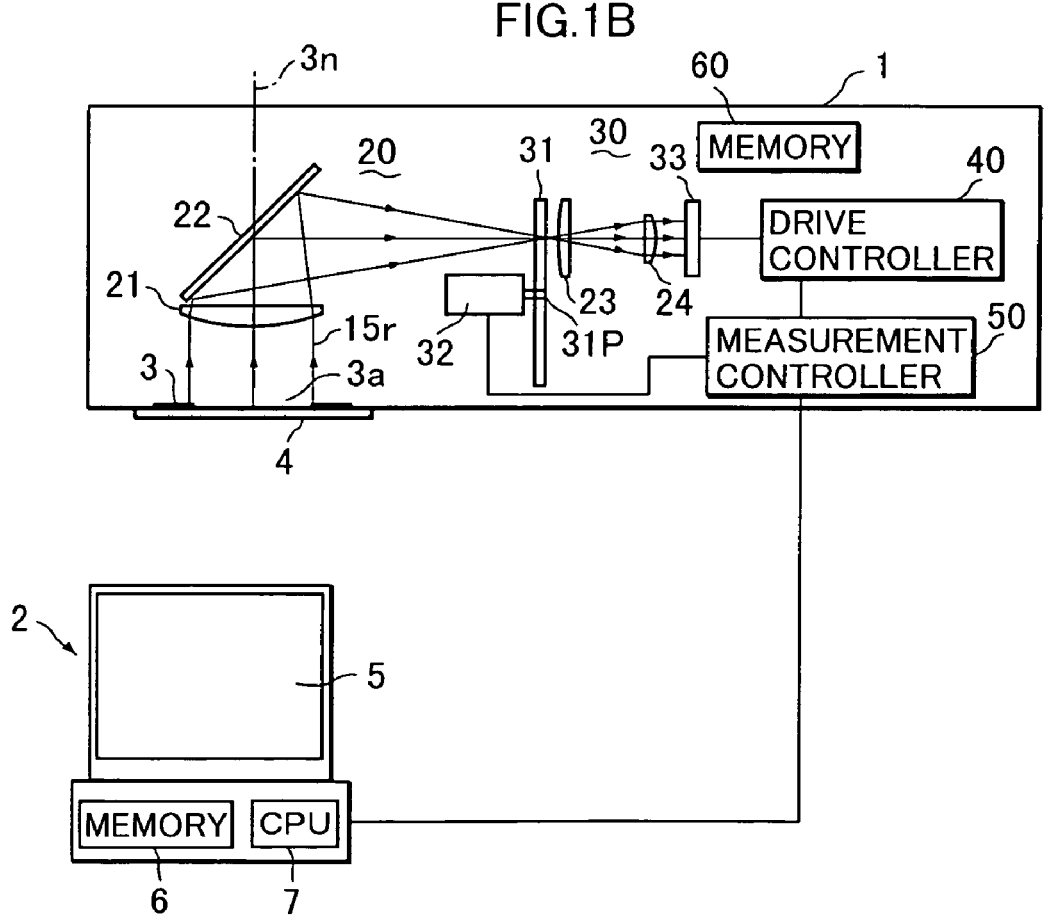
FIG. 1B is a diagram showing an entire construction of the test chart color measuring system, a color measuring head provided in the system being shown from one side, and the illuminating unit being not shown for the sake of convenience.

Referring to FIGS. 1A and 1B, a test chart color measuring system 1 according to an embodiment of the invention is comprised of a color measuring head 1 and a personal computer (PC) 2. The color measuring head (color image taking apparatus) 1 includes an illuminating unit 10, a light receiving optical system 20, a color image pickup unit 30, a drive controller 40 and a measurement controller 50, which are integrally accommodated in a head main body. At the bottom end of the main body of the color measuring head 1 is arranged a specimen mask 3, which is formed with a substantially rectangular sample opening 3a. The color measuring head 1 picks up a color image of a test chart 4 as a measurement specimen with the test chart 4 placed to face the specimen opening 3a.

Figure 3:
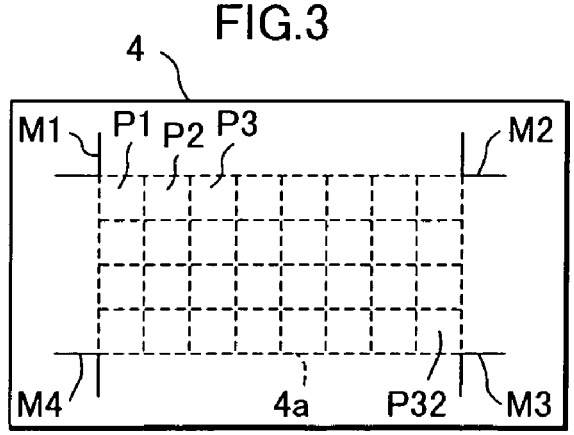
FIG. 3 is a plan view of a test chart.

The test chart 4 is such that specified color samples P1 to P32 are arrayed in sections (indicated by broken lines in FIG. 3) obtained by dividing a rectangular sample area 4a like a matrix as shown in FIG. 3. Each section of the sample area 4a has a specified shape (e.g., square in this embodiment) and a specified size (e.g., sides of 3 mm in this embodiment), and the sample area 4a is divided into a specified number of sections (e.g., 4×8 sections in this embodiment). The test chart 4 is also provided with L-shaped markers M1, M2, M3, M4 (indicated by solid lines in FIG. 4) which indicate the outer boundary of the sample area 4a and have, for example, a high density so as to be easily distinguishable).

Figure 2:
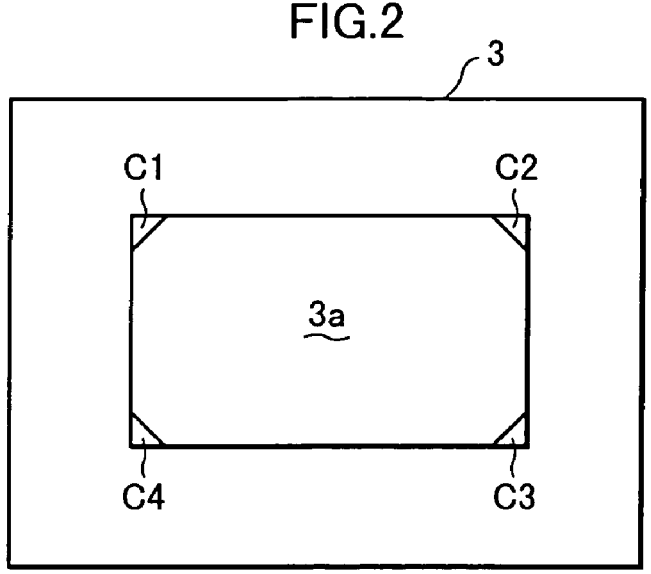
FIG. 2 is a diagram showing a specimen mask.

At the four corners of the specimen opening 3a are provided achromatic reference areas C1, C2, C3, C4 as shown in FIG. 2. Images of these reference areas C1 to C4 are picked up simultaneously with the test chart 4. A variation in the amount of light emitted from a light source 11 is compensated, using image informations of the reference areas C1 to C4 as reference values and ratios to these reference values as image informations of the respective color samples. In this embodiment, the reference areas C1 to C4 at the four corners of the specimen opening 3a may be of the same achromatic color, and an average value of the image informations of the reference areas C1 to C4 may be used as a reference value. Alternatively, the reference areas C1 to C4 may be of achromatic colors having different values of brightness, and a suitable reference area may be selected in accordance with the image information of the color sample.

Referring back to FIGS. 1A and 1B, the PC (image processor) 2 is provided with a monitor (i.e., display device) 5, a memory unit 6 and a CPU 7. The memory unit 6 includes a ROM for storing a control program, a RAM for temporarily storing data, an EEPROM, etc. In the memory unit 6 is also stored an information on the arrangement of the color samples on the test chart 4, i.e., the shape (e.g., square in this embodiment), size (e.g., sides of 3 mm in this embodiment) and the number (e.g., 4×8 in this embodiment) of the color samples. The ROM of the memory unit 6 is not limited to a semiconductor memory, but may be a CD-ROM, a hard disk or like storage medium. The CPU 7 has a function of calculating color values of the color samples to be described later by reading the control program stored in the memory unit 6 and implementing it.

In FIG. 1A, the illuminating unit 10 includes the light source 11, first and second planar reflectors 12a, 12b, first and second collimating lenses 13a, 13b and is adapted to illuminate the test chart 4 which is so placed as to face the specimen opening 3a. The light source 11 is, for example, comprised of a tungsten light bulb having a short filament, and is provided on a normal 3n to the specimen opening 3a. The first and second collimating lenses 13a, 13b are arranged such that the focal points thereof are located at the light source 11 (for example, at the position of the filament of the tungsten light bulb).

In FIG. 1B, the light receiving optical system 20 includes an object side field lens 21, a planar reflector 22, a focusing lens 23 and an image side field lens 24, and is adapted to introduce a light reflected from the illuminated test chart 4 to the color image pickup unit 30. The object side field lens 21 is arranged such that its optical axis coincides with the normal 3n to the specimen opening 3a, and the focusing lens 23 is arranged at the focal point of the object side field lens 21. The lenses 21, 23 construct an object side telecentric optical system. Further, the image side field lens 24 is arranged such that its focal point is located at the focusing lens 23, thereby constructing an image side telecentric optical system.

The color image pickup unit 30 includes a filter disk 31, a motor or driver 32 and an area sensor 33 and is adapted to sense incident beams at a plurality of different spectral sensitivities.

Figure 4:
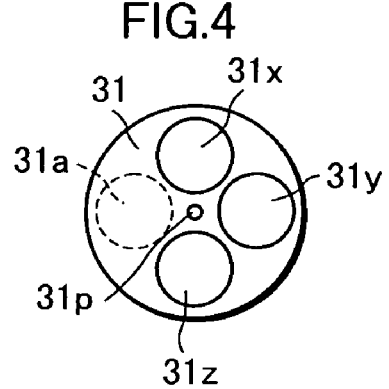
FIG. 4 is a diagram showing a filter disk.

The filter disk 31 is, as shown in FIG. 4, such that three filtering sections 31x, 31y, 31z having specified spectral transmission factors and a blocking section 31a are concentrically displaced at intervals of 90° about a center 31P. As shown in FIG. 1B, this filter disk 31 is rotatably supported about the center 31P near the incident side (left side in FIG. 1B) of the focusing lens 23, such that the center of the filtering section 31x, 31y or 31z or the blocking section 31a comes into coincidence with the optical axis of the focusing lens 23 to be located in the beams when the filter disk 31 is rotated.

The filtering sections 31x, 31y, 31z have such spectral transmission characteristics that the entire spectral response characteristics which are sums of the spectral transmission factors of the filtering sections 31x, 31y, 31z, the spectral luminance characteristic of the light source 11, the spectral sensitivity characteristic of the area sensor 33, and the spectral transmission characteristics of the illuminating/light receiving optical systems realize spectral sensitivities x, y, z of a standard observer having a 2° field which is defined by the CIE (International Committee on Illumination) (hereinafter, merely "spectral sensitivities x, y, z").

The area sensor 33 is brought into a dark state by locating the blocking section 31a in the beams, so that an offset image information used for zero-calibration (i.e., correction to convert the optically dark state into an electrical reference level) of the area sensor 33 with the light source 11 turned on can be obtained.

The motor 32 is, for example, comprised of a stepping motor and adapted to rotate the filter disk 31. The area sensor 33 is an image pickup element in which a plurality of pixels are two-dimensionally arrayed, and each pixel outputs an electrical signal corresponding to an amount of received light. For example, a CCD image sensor or a MOS image sensor may be used as the image pickup element.

The drive controller 40 and the measurement controller 50 are comprised of one or more CPUs and input/output circuits and operate in accordance with the control program stored in the memory unit 6.

The drive controller 40 supplies a specified drive pulse signal to the area sensor 33, and sends the electrical signals outputted from the respective pixels to the measurement controller 50 after converting them into digital values. Since a suitable exposure period differs depending on the density of the respective color samples, a plurality of image informations are obtained by causing the area sensor 33 to sense the images for different exposure periods for the filtering sections 31x, 31y, 31z and the blocking section 31a in this embodiment. In other words, there are three exposure periods T, 4t, 16T with T being an exposure period for, e.g., a white sample in this embodiment.

The measurement controller 50 drives the motor 32 to rotate at intervals of specified angles to successively locate the respective sections 31x, 31y, 31z, 31a of the filter disk 31 in the beams, and sends the digital values obtained from the area sensor 33 via the drive controller 40 to the PC 2 with the section 31x, 31z, 31z or 31a located in the beams.

How the optical system thus constructed operates is described. Beams 14a, 14b from the light source 11 are collimated into parallel beams 15a, 15b by the collimating lenses 13a, 13b after being reflected toward the specimen opening 3a by the first and second planar reflectors 12a, 12b. Accordingly, the test chart 4 opposed to the specimen opening 3a is illuminated by the parallel beams 15a, 15b in two directions at ±45° to the normal 3n to the specimen opening 3a, and components 15r of the reflected light from the illuminated test chart 4 propagating in a direction of the normal 3n is incident on the object side field lens 21 of the light receiving optical system 20. In this way, the illuminating/light receiving optical systems of this embodiment construct a so-called 45/0 geometry.

The reflected light components 15r incident on the object side field lens 21 are gathered at the focusing lens 23 after having their direction of propagation changed toward the focusing lens 23 by the planar reflector 22, made into parallel beams by the image side field lens 24 and incident on the area sensor 33, with the result that an image of the test chart 4 is focused on the area sensor 33. Sensing data of the area sensor 33, i.e., the spectral sensitivities x, y, z when the filtering sections 31x, 31y, 31z and the blocking section 31a are located in the beams, the image informations corresponding to offsets, and the image informations of the reference areas C1 to C4 are converted into digital values by the drive controller 40 and sent to the PC 2 via the measurement controller 50.

The CPU 7 of the PC 2 has a function as a calculation means for distinguishing the individual color samples of the test chart 4 based on the image informations received from the color measuring head 1, and calculating color values of the respective color samples.

The images of the 32 color samples contained in the image of the test chart 4 are extracted one by one, and the color values of the respective color samples are calculated using the image data of the extracted images.

The image of each color sample is extracted by calculating a boundary thereof using the image informations of the markers M1, M2, M3, M4 easily distinguishably printed at the four corners of the rectangular sample area 4a and the array information of the color samples.

Figure 5:
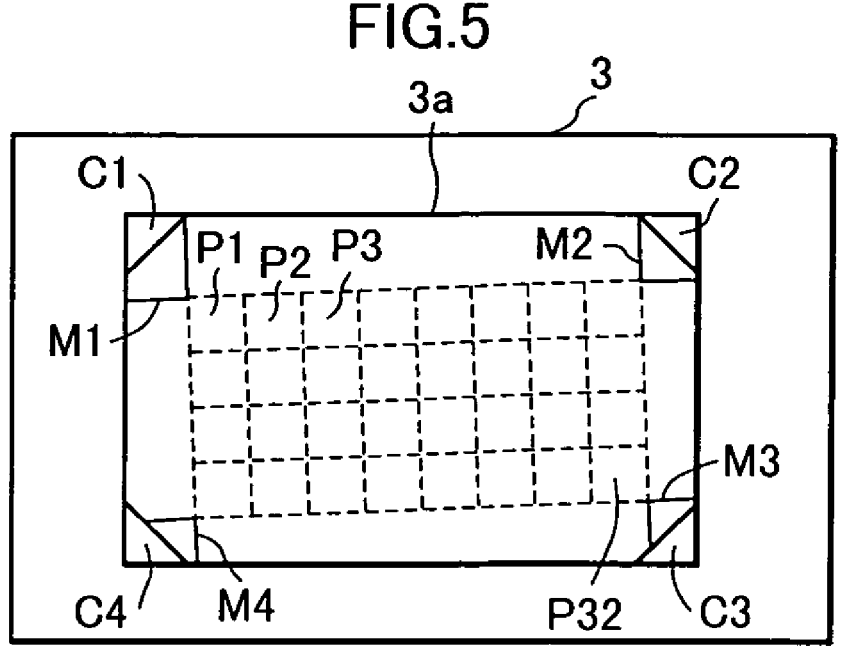
FIG. 5 is a diagram showing an image of a sample area where color samples are arrayed.

Specifically, an image of the sample area 4a in which the color samples P1 to P32 are arrayed may not be necessarily parallel to the sides (outer periphery of an image sensing area) of the specimen opening 3a as shown in FIG. 5. Positions of lines constituting the boundary of the sample area 4a are calculated based on the image informations of the easily distinguishable markers M1 to M4, and the boundaries of the respective color samples are obtained using the array information that a known number of color samples P1 to P32 of a square shape having sides whose length is known are arranged at equal intervals.

For example, if the sample area 4a has a size of H (vertical dimension)×L (horizontal dimension), boundaries for equally dividing the horizontal dimension L into 8 sections are calculated in vertical direction, and boundaries for equally dividing the vertical dimension H into 4 sections are calculated in horizontal direction (see boundary lines shown by broken lines in FIG. 5). The areas of the respective color samples in the sample area 4a are distinguished by dividing the sample area 4a based on the information on these boundaries.

The color values of the color samples are calculated by a known method using values corresponding to the spectral sensitivities x, y, z. A known example of color value calculation is disclosed in U.S. Pat. No. 4,773,761. At this time, the color value of one color sample is calculated based on an average value of data obtained by all the pixels except specified pixels adjacent to the boundary. Further, the color values are calculated for each of the filtering sections 31x, 31y, 31z, using the image information obtained for the proper exposure period among those obtained by picking up the image for four exposure periods T, 2T, 4T, 8T.

The proper exposure time refers to an exposure time which provides an image information whose signal level is at maximum not exceeding full scale of 255 if, the signal level of the image information is expressed by 0 to 255 (8 bits).

Further, in the case that the proper exposure periods differ depending upon the filtering sections 31x, 31y, 31z, a gain ratio among the image informations by the filtering sections 31x, 31y, 31z can be set at a ratio of the exposure periods. In the case of a test chart in which the densities of the color samples change stepwise, the color sample of the density step whose image information obtained for one exposure period approximates to a full scale may be selected, and a ratio of this image information to an image information of the same color sample obtained for an exposure period a step shorter may be used as the gain ratio.

Since the object side telecentric optical system is constructed by arranging the object side field lens 21 such that its focal point is located at the focusing lens 23 in this embodiment, an image can be formed over the entire measurement area by the reflected light distributed about the direction perpendicular to the specimen surface.

Further, since the test chart 4 as the measurement specimen is illuminated by the parallel beams 15a, 15b formed by the first and second collimating lenses 13a, 13b in directions at ±45° to the normal 3n, the illuminating and light detecting directions can be at 45° to and perpendicular to the specimen surface over the entire measurement area, i.e., the 45/0 geometry can be realized while maintaining the brightness of the optical system.

Accordingly, the illuminating condition and light detecting condition which are necessary when the measurement specimen is two-dimensionally sensed by the area sensor 33 can be made uniform over the entire measurement area.

In the object side telecentric optical system, the object side field lens 21 needs to be arranged in a position maximally close to the specimen surface in order to suppress the influence of the object side field lens 21 on a focusing performance. However, as is clear from FIG. 1, it is necessary to space the object side field lens 21 away from the specimen surface by a specified distance in order to prevent the object side field lens 21 from interrupting the illuminating beams from the illuminating unit 10. This distance needs to increase as the diameter of the object side field lens 21 increases.

Thus, in this embodiment, the measurement area takes a rectangular shape, the specimen is illuminated from the shorter sides of the measurement area, i.e., from planes parallel with the plane of FIG. 1A, and the object side field lens 21 also takes a rectangular shape in conformity with the measurement area. By doing so, a distance between the object side field lens 21 and the specimen surface can be shortened, thereby enabling a satisfactory image pickup operation.

Further, according to this embodiment, the image side telecentric optical system is constructed by the image side field lens 24 arranged such that its focal point is located at the focusing lens 23. Accordingly, the beams can be substantially perpendicularly incident on the area sensor 33 over the entire sensing area. This can prevent a reduction in light gathering efficiency at a peripheral portion of the area sensor 33 and lead to more uniform and improved sensitivity over the entire sensing area. Particularly, in the case that the area sensor 33 includes a fine lens for each pixel, the above effects are more significant since an ability to gather perpendicularly incident beams is highest. The arrangement of the image side field lens 24 in proximity to the area sensor 33 more securely ensures perpendicular incidence over the entire sensing area.

Since the filter disk 31 is arranged in vicinity of the focusing lens 23, the beams for forming an image of the measurement area pass through the focusing lens 23 at a full effective area. Thus, these beams are less likely to be influenced by nonuniform transmission factor in the planes of the filtering sections 31x, 31y, 31z.

Further, according to this embodiment, the test chart 4 having a small area (4×8 color samples of 3 mm×3 mm, and the size of the sample area is 12 mm×24 mm in this embodiment) in which no space is provided at the boundaries of the respective color samples P1 to P32 is used. Therefore, as described later, a color output apparatus such as a color printer or a color copier can be caused to print a plurality of test charts in different positions of a sheet, and characteristics of the output colors (e.g., output colors at the parts having different photosensitive elements) of the respective parts of the color output apparatus can be obtained.

Although no space is provided at the boundaries of the respective color samples, the image informations of the individual color samples can be securely extracted by calculating the boundaries based on the easily distinguishable markers m1 to M4 printed at the four corners of the sample area 4a and the array information of the color samples.

Further, since the color value is obtained using the average value of the data obtained from all the pixels except those adjacent to the boundary of the color sample, noise pixels due to scattering of inks of the neighboring color samples which appear near the boundaries with the neighboring color samples can be deleted. Further, noise pixels due to external matters contained in a printing sheet can be deleted by deleting the pixels distant from the center of a distribution when the effective pixels of the color samples are expressed in a histogram.

Further, the image of the test chart is picked up a plurality of times for a plurality of different exposure periods, so that the image informations of the test chart having different signal levels can be obtained. Accordingly, even if a test chart in which a multitude of color samples are two-dimensionally arrayed and a difference between maximum and minimum values of the density of all the color samples is large, high-precision color measurement can be performed for all the color samples using the image informations obtained by the proper exposure periods corresponding to the densities of the respective color samples.

Figure 6:
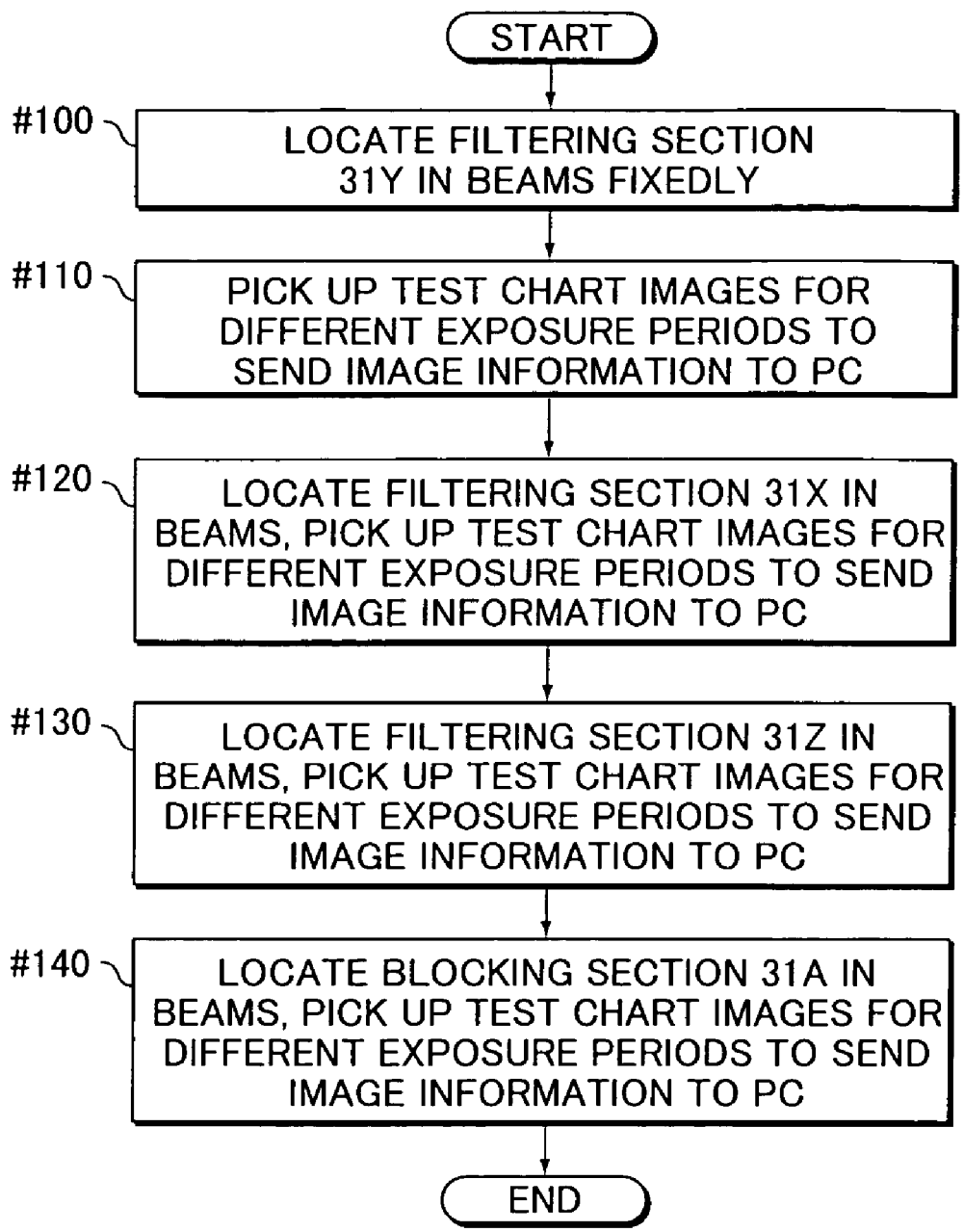
FIG. 6 is a flowchart showing a flow of color measuring operations by the color measuring head.

Next, operations of this embodiment is described with reference to flowcharts shown in FIGS. 6 and 7. FIG. 6 is a flowchart showing a flow of color measuring operations by the color measuring head 1.

First, the color measuring head 1 is positioned to lie the entire sample area 4a of the test chart 4 within the sensing area of the area sensor 33 (Step #100). In other words, the filtering section 31y is, for example, fixedly located in the beams, monochromatic images continuously picked up are displayed on the monitor 5 of the PC 2, and the position of the color measuring head 1 is adjusted using the markers M1 to M4 displayed on the screen as references.

Subsequently, the image of the test chart 4 is successively picked up for the exposure periods of T, 4T, 16T with the filtering section 31y located in the above position, and the obtained three image informations are sent to the PC 2 (Step #110). The filter disk 31 is then rotated to locate the filtering section 31x in the beams, the image of the test chart 4 is successively picked up for the exposure periods of T, 2T, 4T, 8T in this state, and the obtained four image informations are sent to the PC 2 (Step #120).

Subsequently, the filter disk 31 is rotated to locate the filtering section 31z in the beams, the image of the test chart 4 is successively picked up for the exposure periods of T, 2T, 4T, 8T in this state, and the obtained four image informations are sent to the PC 2 (Step #130). The filter disk 31 is then rotated to locate the blocking section 31a in the beams, the image of the test chart 4 is successively picked up for the exposure periods of T, 2T, 4T, 8T in this state, and the obtained four image informations are sent to the PC 2 (Step #140).

Figure 7:
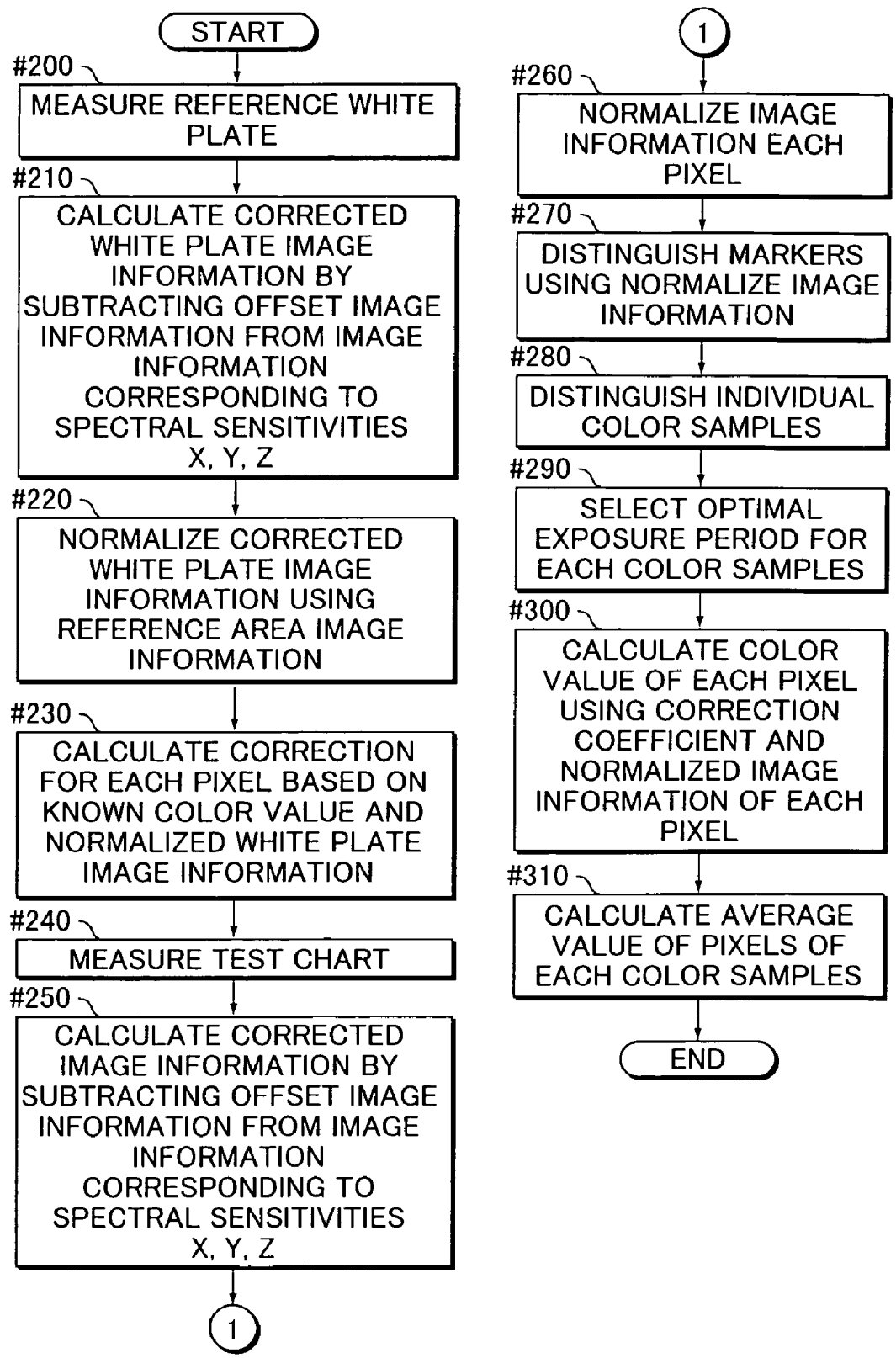
FIG. 7 is a flowchart showing a flow of operations by the color measuring head and a personal computer.

FIG. 7 is a flowchart showing an entire operation flow of the color measuring head 1 and the PC 2. First, prior to the color measurement of the test chart 4, white correction is performed (Steps #200 to #230). In the white correction, color measurement is performed by the color measuring head 1 for a reference white plate whose color value is known with the reference white plate placed to face the specimen opening 3a (Steps #100 to #140 of FIG. 6, only the exposure period T is adopted for this color measurement) (Step #200).

Subsequently, a corrected white plate image information which is an corrected image information of the reference white plate is calculated by subtracting an offset image information from the respective image informations corresponding to the spectral sensitivities x, y, z pixel by pixel for each corresponding exposure period (Step #210).

Subsequently, a normalized white plate image information is calculated by normalizing the corrected white plate image informations of each pixel using the image informations of the reference areas C1 to C4 in order to eliminate the influence of a variation in amount of light emitted from the light source 11 (Step #220). Correction coefficients for the respective pixels are calculated based on the known color value of the reference white plate and the normalized white plate image information (Step #230). The reference area C1 is in white, and the reference areas C2 to C4 are in achromatic reference colors having about ½, ¼, ⅛ of the reflection factor of white. The reference areas C1 to C4 are respectively used as references for the exposure periods T, 2T, 4T, 8T.

Subsequently, color measurement (Steps #100 to #140 of FIG. 6) is applied with the test chart 4 as a measurement specimen placed to face the specimen opening 3a (Step #240).

Corrected image informations are calculated by subtracting the offset image information from the respective image informations corresponding to the spectral sensitivities x, y, z pixel by pixel for the corresponding exposure periods (Step #250). Subsequently, the image informations of the respective pixels are normalized using the image information of any of the reference areas C1 to C4 corresponding to the exposure period, thereby obtaining normalized image informations (Step #260). The markers M1 to M4 are distinguished using this normalized image informations, and the positions thereof are calculated (Step #270).

The boundaries of the respective color samples are discriminated based on the position information of the markers M1 to M4, the array information of the color samples of the test chart 4 stored in the memory unit 6, i.e., the information on the shape (e.g., square in this embodiment), size (e.g., sides of 3 mm in this embodiment), and number (e.g., 4 (vertical)×8 (horizontal) in this embodiment) of the color samples, thereby distinguishing the individual color samples (Step #280).

Subsequently, an optimal exposure period is selected for each color sample based on the image information thereof (Step #290). In the following calculations, the image information corresponding to the selected exposure period is used.

The color values of the respective pixels are then calculated using the correction coefficients for the pixels obtained by the white correction and the normalized image informations of the pixels (Step #300). Then, an average value of the color values of the pixels within the area of each color sample distinguished in Step #280 is calculated, and is assumed as the color value of this color sample (Step #310).

Although the image pickup operation is performed for positioning with the filtering section 31y located in the beams in Step #100 of the flow shown in FIG. 6, an opening formed in the filter disk 31 may be located in the beams for positions. Further, a color image may be used as an image for positioning by switching the filtering sections 31x, 31y, 31z at high speed and successively performing the image pickup operations during one exposure period.

Figure 8:
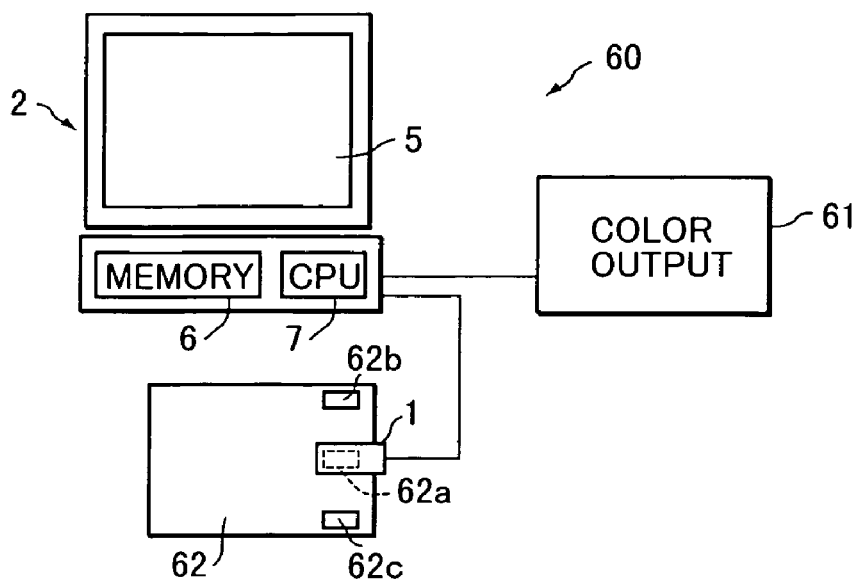
FIG. 8 is a diagram showing a color output apparatus correcting system according to an embodiment of the invention.

Next, one embodiment of the color output apparatus correcting system according to the invention is described. FIG. 8 is a diagram showing the color output apparatus correcting system as a most general example of application of the test chart color measuring system.

This color output apparatus correcting system 60 is provided with the test chart color measuring system comprised of the color measuring head 1 and the PC 2, and adapted to correct output colors printed on a sheet by a color output apparatus 61 such as a color printer or a color copier connected with the PC 2.

In addition to the above functions, the CPU 7 of the PC 2 has following functions (1) and (2).

(1) Function of sending a control signal to the color output apparatus 61 to cause it to output a test chart for correction which has the same configuration as the test chart 4.

(2) Function as a correcting means for calculating an output color correction data of the color output apparatus 61 based on a result of color measurement conducted with the output test chart for correction placed to face the specimen opening 3a of the color measuring head 1.

How the system 60 operates is described. When a specified control signal is sent from the PC 2 to the color output apparatus 61, a test chart for correction 62a is printed on a sheet 62 by the color output apparatus 61. In the test chart 62a, color samples are arrayed as in FIG. 2. When an image of the test chart 62a is picked up using the color measuring head the obtained image information is sent to the PC 2. The PC 2 processes the received image information, calculates the color values of the respective color samples, and generates a correction data used to correct a control signal to be sent to the color output apparatus 61 based on the calculated color values in accordance with the control program.

In this case, since the test chart has a small area, test charts 62b, 62c may be printed at ends of the sheet by the color output apparatus 61 in addition to the test chart 62a printed in the middle of the sheet. By outputting a plurality of test charts in different positions of the sheet 62, sensing them and measuring the color thereof in this way, output color characteristics of the respective parts of the color output apparatus 61 (e.g., output colors at the parts having different photosensitive elements) can be obtained.

The present invention is not limited to the above embodiment, and may be embodied as follows.

Figure 9:
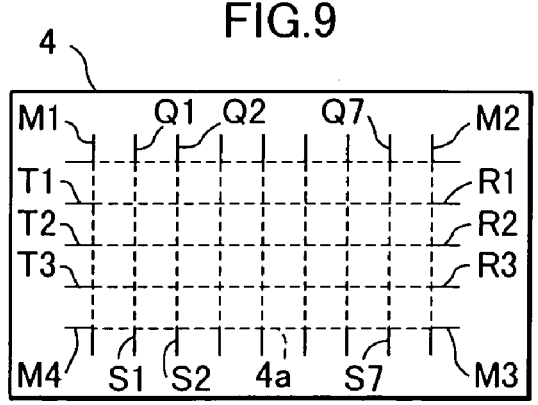
FIG. 9 is a diagram showing a different arrangement of markers.

(1) In the foregoing embodiment, the markers M1 to M4 are provided at the four corners of the sample area 4a, and the image informations of the respective color samples are extracted by using the information on the array thereof in the test chart. However, the arrangement of the markers is not limited to the above one. For example, as shown in FIG. 9, markers Q1 to Q7, R1 to R3, S1 to S7, T1 to T3 which are line segments indicating the vertical and horizontal boundary positions of the color samples P1 to P32 may be provided around the sample area 4a.

In the case that the markers are provided only at the four corners, an error may occur at the boundaries of the distinguished color samples due to the influence of image distortion and the like caused by the optical system. However, this embodiment is influenced to a lesser degree by the image distortion and the like and, accordingly, the color samples can be properly distinguished.

(2) The markers M1 to M4 are provided at the four corners of the sample area 4a in the foregoing embodiment. Without providing the markers, the images of the respective color samples may be extracted by calculating the boundaries based on color differences between neighboring color samples after calculating the color values of the respective pixels.

(3) Although the image informations at the spectral transmission factors of the respective filtering sections 31x, 31y, 31z are obtained by the area sensor 33 by successively locating the filtering sections 31x, 31y, 31z in the beams in the foregoing embodiment, the present invention is not limited thereto. For instance, the filter disk 31 may be provided with 16 kinds of band filters of 400 nm to 700 nm at intervals of, e.g., 20 nm to calculate a reflection factor.

Alternatively, the filter disk 31 may be provided with 6 kinds of filters corresponding to the spectral sensitivities x, y, z and to Y (yellow), M (magenta) and C (cyan), and both the color values and the densities may be calculated. Further, instead of providing the filter disk 31, a single-plate color CCD sensor obtained by combining the area sensor 33 and a stripe filter of R (red), G (green), B<blue) may be used.

(4) The control program loaded in the PC 2 in the color output apparatus correcting system shown in FIG. 8 may have a function of implementing two switchable measurement modes: an array measurement mode and a spot measurement mode.

The array measurement mode is a mode for measuring the color of the test chart in which a plurality of color samples are arrayed as in FIG. 8. On the other hand, the spot measurement mode is a mode for measuring the color of a desired part of the printed image, i.e., usable as a usual spot colorimeter.

Figure 10:
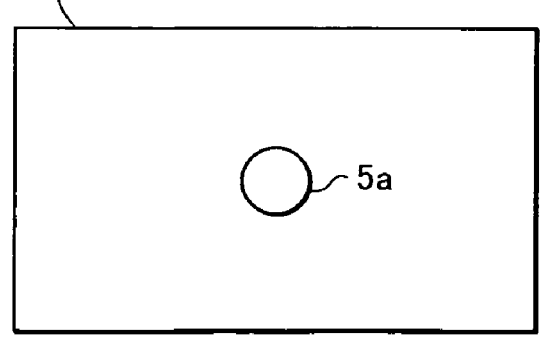
FIG. 10 is a diagram showing an index displaced on a monitor.

In the spot measurement mode, the image picked up by the color measuring head 1 is displayed on the monitor 5 together with an index 5a (e.g., a round spot in this embodiment) indicating a central measurement spot as shown in FIG. 10, and a color value is calculated using an image information within an measurement area indicated by the index 5a.

According to this embodiment, correction for color output of the color output apparatus and administration of final output colors can be performed using a single measuring apparatus having the same characteristic.

Figure 11:
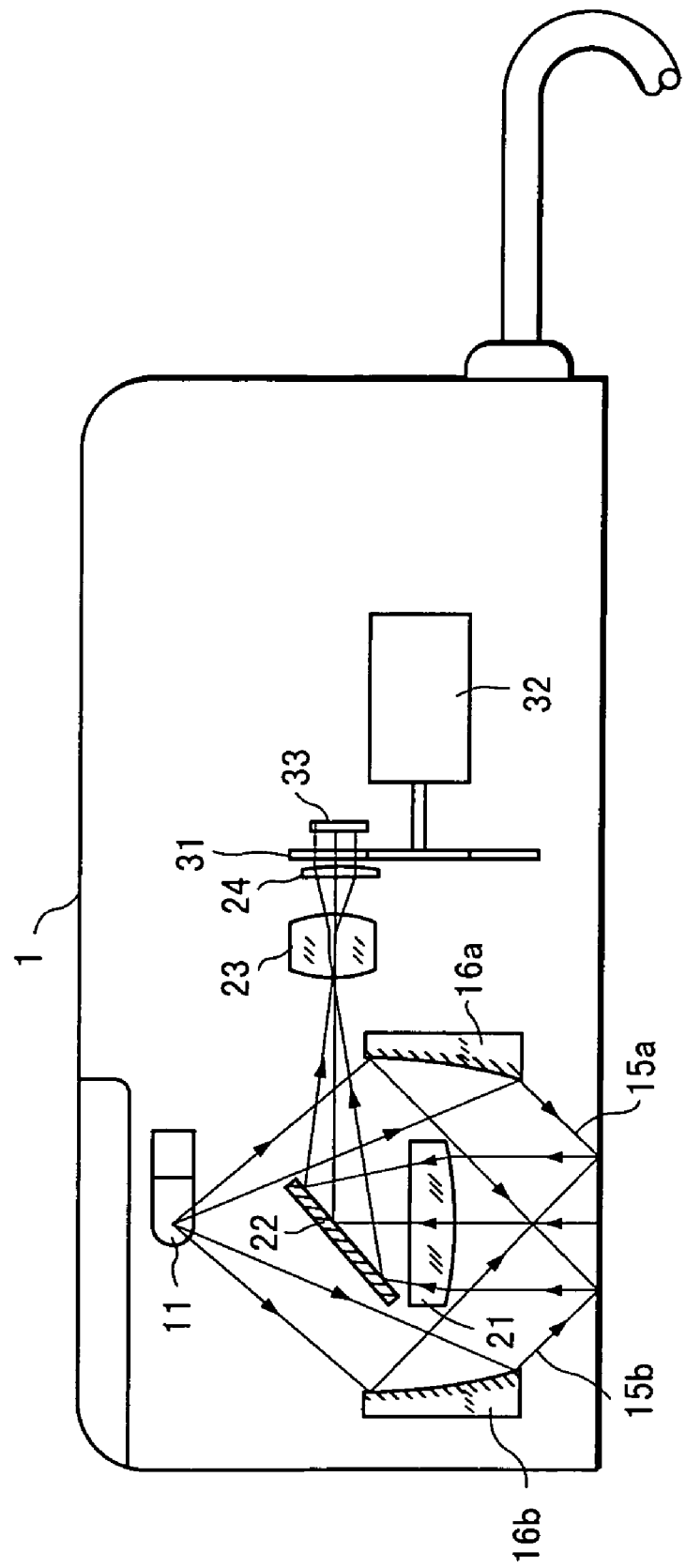
FIG. 11 is a diagram showing a mode for forming a parallel beam by means of concave mirrors.

(5) Although the parallel beams 15a, 15b are formed by the first and second planar reflectors 12a, 12b and the first and second collimating lenses 13a, 13b in the foregoing embodiment as shown in FIG. 1A, the present invention is not limited thereto. For example, as shown in FIG. 11, first and second concave mirrors 16a, 16b may be provided instead of the first and second planar reflectors 12a, 12b and the first and second collimating lenses 13a, 13b, and the parallel beams 15a, 15b may be formed by these concave mirrors 16a, 16b. It should be noted that the drive controller 40, the measurement controller 50 and the memory unit 6 are not shown in FIG. 11.

Figure 12:
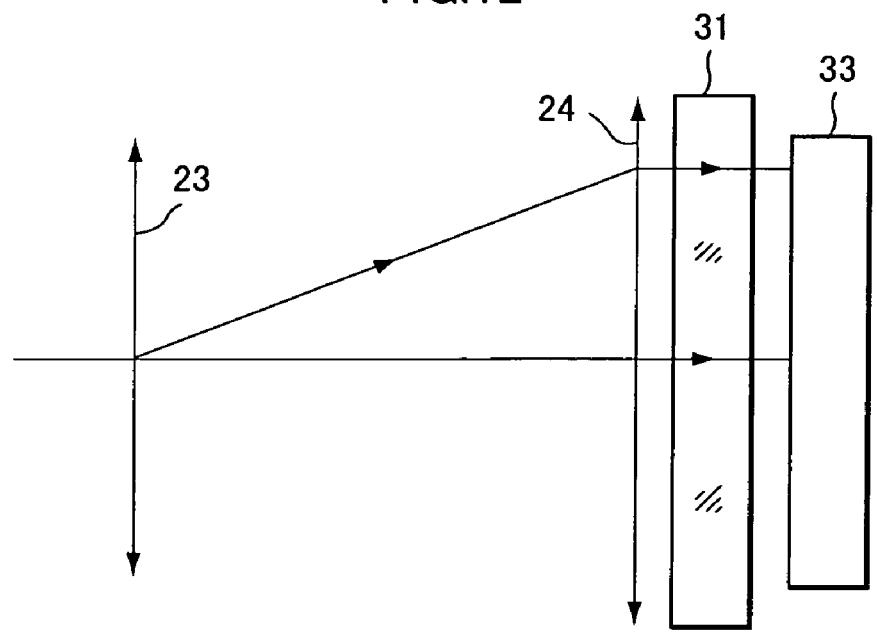
FIGS. 12 and 13 are diagrams showing an influence by an angle of incidence of a beam on the filter disk.

In this embodiment, the filter disk 31 is arranged between the image side field lens 24 and the area sensor 33. Since every beam forming the image in the measurement area is perpendicularly incident on the filter disk 31 as shown in FIG. 12, the lengths of the optical paths do not differ depending on positions of incidence. Further, even if the optical thickness and the refractive indices differ depending upon positions of incidence on the respective filtering sections of the filter disk 31, no pixel displacement occurs.

Figure 13:
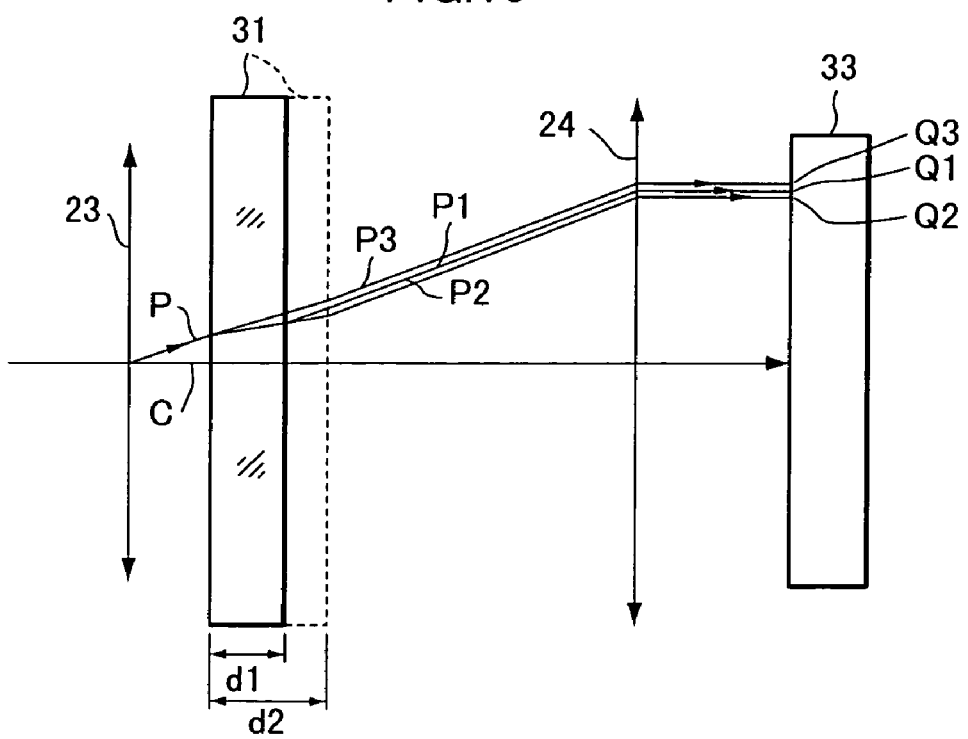

Contrary to this, if the filter disk 31 is arranged at an emergent side of the focusing lens 23, for example, as shown in FIG. 13, a beam C focused at the center of the sensing area is perpendicularly incident on the filter disk 31, but a beam P focused at a peripheral part of the sensing area has a longer optical path since it is obliquely incident on the filter disk 31.

Accordingly, if the filtering sections 31x, 31y, 31z have different thicknesses, the beam P emerges out from the filtering section as a beam P1 when the thickness is d1 while emerging out therefrom as a beam P2 when the thickness is d2. Further, the focusing position of the beam P on the area sensor 33 is changed from Q1 to Q2 as the thickness is changed from d1 to d2.

Even if the filtering sections 31x, 31y, 31z have the same thickness, an angle of refraction changes if the refractive indices of the filtering sections 31x, 31y, 31z change. Thus, the beam P emerges out from the filtering section as the beam P1 at a specific refractive index while emerging out therefrom as a beam P3 at another refractive index, and the focusing position of the beam P on the area sensor 33 is accordingly changed from Q1 to Q3.

Since the angle of incidence of the beam on the filtering section differs depending on the focusing position in the arrangement as shown in FIG. 13, the length of the optical path differs depending on the focusing position. This causes a problem of changing the spectral sensitivities and a problem of an occurrence of pixel displacement at the peripheral portion of the sensing area if the three filtering sections have different optical thicknesses and/or different refractive indices. However, the arrangement as shown in FIG. 11 (or FIG. 12) is free from such problems.

Figure 14A:
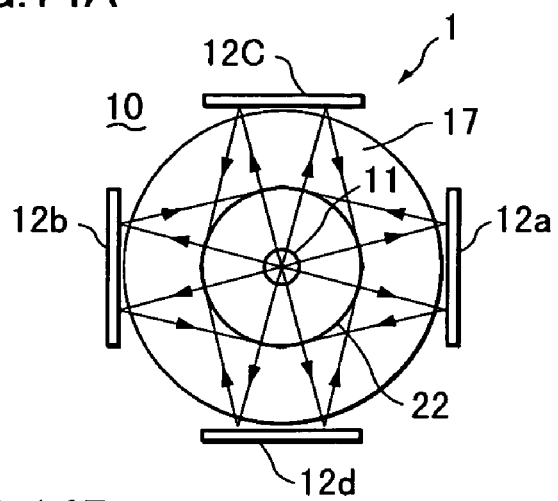
Figure 14B:
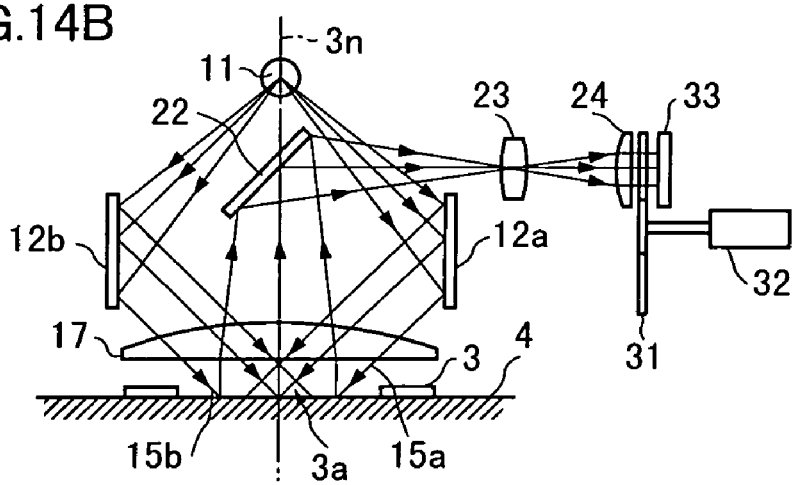

(6) FIGS. 14A and 14B show a color measuring head having a differently constructed optical system, wherein FIG. 14A is a plan view of an illuminating unit when viewed from a side of a light source, and FIG. 14B is a side view showing the illuminating unit, a light receiving optical system and an image pickup unit when viewed from the bottom of FIG. 14A. The same elements as those in FIG. 1 are identified by the same reference numerals in FIGS. 14A and 14B, and a drive controller 40, a measurement controller 50 and a memory unit 6 are not shown in FIG. 14B.

In this embodiment, an illuminating unit 10 is provided with a light source 11, first to fourth planar reflectors 12a, 12b, 12c, 12d and a collimating lens 17. The first to fourth planar reflectors 12a to 12d are arranged about a normal 3n to a specimen opening 3a passing through the light source 11 such that reflecting surfaces thereof are substantially parallel to the normal 3n and also face it, and are adapted to reflect beams from the light source 11, respectively.

The collimating lens 17 collimates the beams reflected by the first to fourth planar reflectors 12a to 12d into parallel beams 15a, 15b, 15c (not shown), 15d (not shown) to illuminate the specimen opening 3a in directions at 45° to the normal 3n.

By taking the above construction, the beams from the light source 11 propagating in four directions are incident at 45° on the collimating lens 17 provided in vicinity of the specimen opening 3a after being reflected toward the specimen opening 3a by the first to fourth reflectors 12a to 12d to become parallel beams. These parallel beams illuminate the specimen opening 3a at 45° to the normal 3n in four directions spaced apart at regular intervals of 90° about the normal 3n.

The collimating lens 17 is so arranged that its optical axis coincides with the normal 3n to the specimen opening 3a and, accordingly, functions also as an object side field lens. A focusing lens 23 is arranged at the focal point of the collimating lens 17.

In this way, in the optical system of FIG. 14, a parallel beam illuminating system, an object side telecentric optical system and an image side telecentric optical system are constructed.

In this embodiment, one collimating lens 17 has a function of the collimating lens and a function of the object side field lens. In other words, the collimating lens 17 forms parallel beams propagating in four directions at 45° to the normal 3n as the illuminating optical system and acts as the object side field lens as a light receiving optical system.

The field lens 21 needs to be spaced away from the specimen opening 3a by a specified distance so as not interfere the illuminating beams in the construction of FIG. 1. However, according to this embodiment, the collimating lens 17 can be arranged very close to the specimen opening 3a since there is no interference between the illuminating optical system and the light receiving optical system. Such an arrangement of the collimating lens 17 has no influence on the focusing performance of the focusing lens 23.

Since the number of parts can be reduced and a circular lens can be used instead of a rectangular lens by providing the single lens with two functions, the color measuring head can be produced at a reduced cost. Further, since the test chart 4 placed to face the specimen opening 3a is illuminated in four directions, influence of direction dependency can be reduced even if the reflection characteristics of the color samples of the test chart 4 have a direction dependency. Since an amount of illuminating light is increased as compared to a case of illumination in two directions, measurement can be conducted with an improved repeatability.

Figure 15:
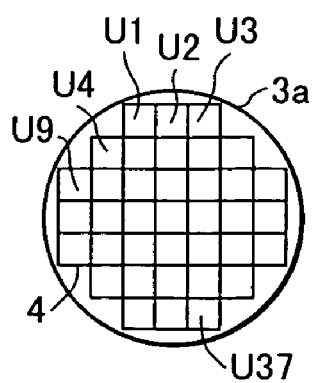
FIG. 15 is a diagram showing a test chart in which color samples are so arrayed as to lie within a circular specimen opening.
Figure 16:
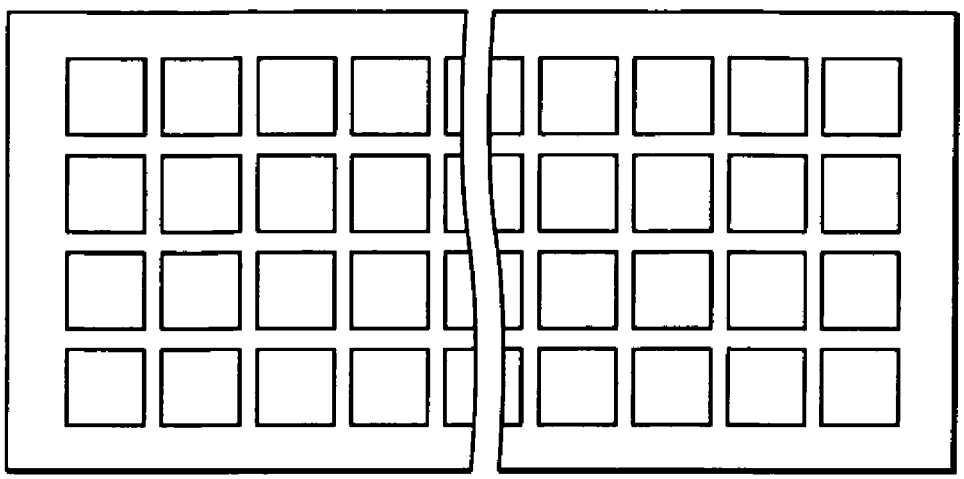
FIG. 16 is a diagram showing a test chart used in a conventional linear scan type colorimeter.
Figure 17:
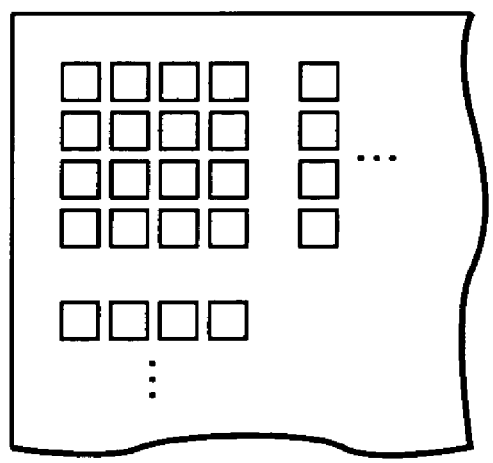
FIG. 17 is a diagram showing a test chart used in a conventional two-dimensional scan type colorimeter.

Since the measurement area can be circular instead of being rectangular, the specimen opening 3a can be circular as shown in FIG. 15, and the test chart 4 in which the color samples are arrayed can be placed to lie within an area corresponding to the circular specimen opening 3a. As a result, a focusing range can be made into a minimum area centering the optical axis.

For example, in the test chart 4 in which an array of the color samples P1 to P32 is rectangular as shown in FIG. 3, a most distant focusing position is 13.4 mm from the optical axis. However, in a test chart 4 in which color samples U1 to U37 of the same size are arranged as shown in FIG. 15, a most distant focusing position is 11.4 mm from the optical axis.

Accordingly, the influences of the image distortion and aberration can be reduced, and nonuniformity of the illuminating beams caused by the aberration can also be reduced.

The test chart 4 in which the color samples are so arrayed as to lie within the circular measurement area as shown in FIG. 15 may be adopted, and the color samples having higher density may be arrayed at the outermost part. Since this enhances a contrast with a white peripheral portion, the color samples can be properly distinguished only by the array information without the markers.

(7) Although color measurement is performed using the reflected light from the illuminated test chart in the foregoing embodiment, the present invention is not limited thereto. For instance, an illuminating unit and a light receiving optical system may be so arranged as to locate the test chart therebetween, and color measurement may be performed using a light transmitted through the illuminated test chart.

In an inventive test chart color measuring system, as described above, an image of a test chart in which specified color samples are arrayed in sections divided in a matrix manner is taken up by a color image taking apparatus to output image signals of a plurality of color components. Image signals corresponding to the respective color samples are extracted by an image processor based on the density of the taken test chart image. Color values of the respective color samples are calculated using extracted image signals. Accordingly, the colors of the respective color samples can be automatically measured within a short period of time without scanning by a color measuring device and a manual operation. The image signals corresponding to the respective color samples can be precisely extracted based on the image density of the test chart.

Alternatively, an image of the test chart is taken up by the color image taking apparatus to output image signals of a plurality of color components, image signals corresponding to the respective color samples are extracted by an image processor based on the taken test chart image and information on how sections are formed. Color values of the respective color samples are calculated using the extracted image signals. Accordingly, the colors of the respective color samples can be automatically measured within a short period of time without scanning by a color measuring device and a manual operation. The image signals corresponding to the respective color samples can be precisely extracted based on the taken test chart image and the information on sample section divisions.

Further alternatively, an image of a test chart in which specified color samples are arrayed in sections divided in a matrix manner and markers indicating boundaries of the sections are provided is taken up by a color image taking apparatus to output image signals of a plurality of color components. Image signals corresponding to the respective color samples are extracted by an image processor based the markers in the taken image of the test chart. Color values of the respective color samples are calculated using extracted image signals. Accordingly, the color of the respective color samples can be automatically measured within a short period of time without scanning by a color measuring device and a manual operation. The image signals corresponding to the respective color samples can be precisely extracted based on the markers in the taken-up image of the test chart.

The test chart placed to face an opening formed in a main body of the color image taking apparatus is illuminated by an illuminator accommodated in the main body. Beams of specific directions from the illuminator are introduced by a light receiving optical system to a color image pickup device provided in the color image taking apparatus. The image pickup device in turn picks up an image of the test chart and outputs image signals corresponding to a plurality of spectral sensitivities different from each other. Image signals of a plurality of color components can be properly outputted.

Illuminating/light receiving optical systems may be provided. The optical systems construct a 45/0 geometry by illuminating the test chart in directions at 45° to a normal to the opening by the illuminator and introducing reflected light propagating in the direction normal to the opening to the color image pickup device by means of the light receiving optical system. Accordingly, color measurement data usable for general purpose can be obtained.

The illuminator may be provided with a light source arranged on the normal to the opening, first and second planar reflectors arranged in symmetrical positions with respect to the normal passing through the light source for reflecting beams from the light source, a first collimating lens arranged such that the focal point thereof is located at the light source and adapted to collimate beams reflected by the first planar reflector into parallel beams to illuminate the opening in the direction at +45° to the normal, and a second collimating lens arranged such that the focal point thereof is located at the light source and adapted to collimate beams reflected by the second planar reflector into parallel beams to illuminate the opening in the direction at −45° to the normal. Accordingly, the test chart can be uniformly illuminated by the parallel beams in the directions of +45°, with the result that the measurement results can be obtained with an improved repeatability.

Alternatively, the illuminator may be provided with a light source arranged on the normal to the opening, first and second concave reflectors arranged in symmetrical positions with respect to the normal passing through the light source and adapted to reflect and focus beams from the light source into parallel beams. The first concave reflector is arranged such that beams reflected thereby illuminate the opening in the direction at +45° to the normal. The second concave reflector is arranged such that beams reflected thereby illuminate the opening in the direction at −45' to the normal. Accordingly, the test chart can be uniformly illuminated by the parallel beams in the directions of +45', with the result that the measurement results can be obtained with an improved repeatability.

The light receiving optical system may be a telecentric optical system. The reflected light from the test chart is introduced in the form of parallel beams to the color image pickup device. Therefore, the measurement results can be obtained with an improved repeatability.

The light receiving optical system may be provided with an object side field lens arranged such that the optical axis thereof coincides with the normal to the opening, and a focusing lens arranged at the focal point of the object side field lens. Thus, the object side telecentric optical system is constructed to introduce beams reflected by the test chart and propagating parallel to the normal to the color image pickup device. Therefore, measurement results can be obtained with an improved repeatability.

The illuminator may be provided with a light source arranged on the normal to the opening, a plurality of planar mirrors arranged around the normal passing through the light source such that reflecting surfaces thereof are substantially parallel to the normal and face the normal, and adapted to reflect the beams from the light source, and a collimating lens arranged such that the focal point thereof is located at the light source and adapted to collimate beams reflected by the plurality of planar mirrors into parallel beams to illuminate the opening in directions at 45° to the normal. Accordingly, the test chart can be uniformly illuminated by parallel beams propagating in the directions at 45° to the normal, and the amount of light illuminating the test chart is increased by being illuminated in four directions. Therefore, the measurement results can be obtained with an improved repeatability.

In this test chart color measuring system, the light receiving optical system is comprised of collimating lens and focusing lens arranged at the focal point of the collimating lens, and a collimating lens is arranged such that the optical axis thereof coincides with the normal to the opening. Accordingly, the collimating lens functions as the object side field lens, and the object side telecentric optical system is constructed by this collimating lens and the focusing lens arranged at the focal point of the collimating lens. The number of optical parts can be reduced by providing one lens with two functions. Therefore, the construction of the color image taking apparatus can be simplified, which in turn contributes to a reduced production cost.

The color image taking apparatus may be provided with a drive controller for causing the color image pickup device to pick up images during a plurality of exposure periods different from each other. The image processor calculates color values using image signals corresponding to exposure periods suitable for the respective spectral sensitivities out of image signals obtained during respective exposure periods. Thus, the color values can be highly precisely calculated.

The image processor may be provided with a display device and a display controller for displaying an index indicating a partial area of an image taken up by the color image taking apparatus on the display device together with the taken-up image, and calculates color values within the area indicated by the index. Thus, the image processor is allowed to have a function as a spot colorimeter.

An inventive color output apparatus correcting system is constructed by the above-mentioned inventive test chart color measuring system, a test chart output controller for controlling a color output apparatus to output a test chart for correction in which specified color samples are respectively arrayed in sections divided in a matrix manner, and a correction data calculator for calculating correction data for the color output apparatus based on respective color values of color samples. Accordingly, the color output of the color output apparatus can be corrected easily and more accurately.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A test chart color measuring system comprising:
   a color image taking apparatus which takes up a color image of a test chart in which specified color samples are respectively arrayed in sections divided in a matrix manner to output image signals of a plurality of color components; and
   an image processor which extracts image signals corresponding to color samples based on the density of the taken test chart image, and calculates a color value of each color sample using the extracted image signal, wherein
   the color image taking apparatus has an optical system including a telecentric optical system that includes:
      a field lens arranged such that an optical axis of the field lens coincides with a normal to an opening at which the test chart is placed, and
      a focusing lens arranged at the focal point of the field lens.

2. The test chart color measuring system according to claim 1, wherein the color image taking apparatus includes:
   a main body having an opening at which the test chart is placed;
   an illuminator which is accommodated in the main body and illuminates the test chart placed at the opening; and
   a color image pickup device which has a plurality of spectral sensitivities different from each other, and picks up an image of the test chart to output image signals corresponding to the plurality of spectral sensitivities, wherein
   the optical system introduces light beams having a specified direction from the test chart to the color image pickup device.

3. The test chart color measuring system according to claim 2, wherein:
   the illuminator illuminates the test chart in a direction of 45° to a normal to the opening; and
   the optical system introduces reflection light beams propagating along the normal to the opening from the test chart.

4. The test chart color measuring system according to claim 3, wherein the illuminator includes:
a light source arranged on the normal to the opening;
first and second planar reflectors arranged in symmetrical positions with respect to the normal passing through the light source for reflecting beams from the light source;
a first collimating lens arranged such that the focal point of the first collimating lens is located at the light source and adapted to collimate beams reflected by the first planar reflector into parallel beams to illuminate the test chart at the opening in the direction at +45° to the normal; and
a second collimating lens arranged such that the focal point of the second collimating lens is located at the light source and adapted to collimate beams reflected by the second planar reflector into parallel beams to illuminate the test chart at the opening in the direction at −45° to the normal.

5. The test chart color measuring system according to claim 3, wherein the illuminator includes:
a light source arranged on the normal to the opening;
first and second concave reflectors arranged in symmetrical positions with respect to the normal passing through the light source and adapted to reflect and focus beams from the light source into parallel beams;
wherein the first concave reflector is arranged such that reflected beams illuminate the test chart at the opening in the direction at +45° to the normal; and
the second concave reflector is arranged such that reflected beams illuminate the test chart at the opening in the direction at −45° to the normal.

6. The test chart color measuring system according to claim 3, wherein the illuminator includes:
a light source arranged on the normal to the opening;
a plurality of planar mirrors arranged around the normal passing through the light source such that respective reflecting surfaces of the plurality of planar mirrors are substantially parallel to the normal and face the normal, and adapted to reflect beams from the light source; and
a collimating lens arranged such that the focal point of the collimating lens is located at the light source and adapted to collimate beams reflected by the plurality of planar mirrors into parallel beams to illuminate the test chart at the opening in directions at 45° to the normal.

7. The test chart color measuring system according to claim 6,
wherein the collimating lens is arranged such that the optical axis of the collimating lens coincides with the normal to the opening.

8. The test chart color measuring system according to claim 2, wherein the color image taking apparatus includes a drive controller which causes the color image pickup device to pick up images during a plurality of exposure periods different from each other, and the image processor calculates color values using image signals corresponding to exposure periods suitable for respective spectral sensitivities out of image signals obtained during the respective exposure periods.

9. The test chart color measuring system according to claim 1, wherein the image processor includes a display device, a display controller which controls the display device to display an index indicating a partial area of an image taken up by the color image taking apparatus together with the taken image, and calculates color values within the area indicated by the index.

10. A test chart color measuring system comprising:
a color image taking apparatus which takes up a color image of a test chart in which specified color samples are respectively arrayed in sections divided in a matrix manner to output image signals of a plurality of color components; and
an image processor which extracts image signals corresponding to color samples based on the taken test chart image and information on section division, and calculates a color value of each color sample using the extracted image signal, wherein
the color image taking apparatus has an optical system including a telecentric optical system that includes:
a field lens arranged such that an optical axis of the field lens coincides with a normal to an opening at which the test chart is placed, and
a focusing lens arranged at the focal point of the field lens.

11. The test chart color measuring system according to claim 10, wherein the color image taking apparatus includes:
a main body having an opening at which the test chart is placed;
an illuminator which is accommodated in the main body and illuminates the test chart placed at the opening; and
a color image pickup device which has a plurality of spectral sensitivities different from each other, and picks up an image of the test chart to output image signals corresponding to the plurality of spectral sensitivities, wherein
the optical system introduces light beams having a specified direction from the test chart to the color image pickup device.

12. The test chart color measuring system according to claim 11, wherein:
the illuminator illuminates the test chart in a direction of 45° to a normal to the opening; and
the optical system introduces reflection light beams propagating along the normal to the opening from the test chart.

13. The test chart color measuring system according to claim 12, wherein the illuminator includes:
a light source arranged on the normal to the opening;
first and second planar reflectors arranged in symmetrical positions with respect to the normal passing through the light source for reflecting beams from the light source;
a first collimating lens arranged such that the focal point of the first collimating lens is located at the light source and adapted to collimate beams reflected by the first planar reflector into parallel beams to illuminate the test chart at the opening in the direction at +45° to the normal; and
a second collimating lens arranged such that the focal point of the second collimating lens is located at the light source and adapted to collimate beams reflected by the second planar reflector into parallel beams to illuminate the test chart at the opening in the direction at −45° to the normal.

14. The test chart color measuring system according to claim 12, wherein the illuminator includes:
a light source arranged on the normal to the opening;
first and second concave reflectors arranged in symmetrical positions with respect to the normal passing through the light source and adapted to reflect and focus beams from the light source into parallel beams;
wherein the first concave reflector is arranged such that reflected beams illuminate the test chart at the opening in the direction at +45° to the normal; and the second concave reflector is arranged such that reflected beams illuminate the test chart at the opening in the direction at −45° to the normal.

15. The test chart color measuring system according to claim 12, wherein the illuminator includes:
   a light source arranged on the normal to the opening;
   a plurality of planar mirrors arranged around the normal passing through the light source such that respective reflecting surfaces of the plurality of planar mirrors are substantially parallel to the normal and face the normal, and adapted to reflect beams from the light source; and
   a collimating lens arranged such that the focal point of the collimating lens is located at the light source and adapted to collimate beams reflected by the plurality of planar mirrors into parallel beams to illuminate the test chart at the opening in directions at 45° to the normal.

16. The test chart color measuring system according to claim 15,
   wherein the collimating lens is arranged such that the optical axis of the collimating lens coincides with the normal to the opening.

17. The test chart color measuring system according to claim 11, wherein the color image taking apparatus includes a drive controller which causes the color image pickup device to pick up images during a plurality of exposure periods different from each other, and the image processor calculates color values using image signals corresponding to exposure periods suitable for respective spectral sensitivities out of image signals obtained during the respective exposure periods.

18. The test chart color measuring system according to claim 10, wherein the image processor includes a display device, a display controller which controls the display device to display an index indicating a partial area of an image taken up by the color image taking apparatus together with the taken image, and calculates color values within the area indicated by the index.

19. A test chart color measuring system comprising:
   a color image taking apparatus which takes up a color image of a test chart in which specified color samples are respectively arrayed in sections divided in a matrix manner and a marker indicating a boundary of sections are provided to output image signals of a plurality of color components; and
   an image processor which extracts image signals corresponding to color samples based on markers in the taken test chart image, and calculates a color value of each color sample using the extracted image signal, wherein
      the color image taking apparatus has an optical system including a telecentric optical system that includes:
         a field lens arranged such that an optical axis of the field lens coincides with a normal to an opening at which the test chart is placed, and
         a focusing lens arranged at the focal point of the field lens.

20. The test chart color measuring system according to claim 19, wherein the color image taking apparatus includes:
   a main body having an opening at which the test chart is placed;
   an illuminator which is accommodated in the main body and illuminates the test chart placed at the opening; and
   a color image pickup device which has a plurality of spectral sensitivities different from each other, and picks up an image of the test chart to output image signals corresponding to the plurality of spectral sensitivities, wherein
      the optical system introduces light beams having a specified direction from the test chart to the color image pickup device.

21. The test chart color measuring system according to claim 20, wherein:
   the illuminator illuminates the test chart in a direction of 45° to a normal to the opening; and
   the optical system introduces reflection light beams propagating along the normal to the opening from the test chart.

22. The test chart color measuring system according to claim 21, wherein the illuminator includes:
   a light source arranged on the normal to the opening;
   first and second planar reflectors arranged in symmetrical positions with respect to the normal passing through the light source for reflecting beams from the light source;
   a first collimating lens arranged such that the focal point of the first collimating lens is located at the light source and adapted to collimate beams reflected by the first planar reflector into parallel beams to illuminate the test chart at the opening in the direction at +45° to the normal; and
   a second collimating lens arranged such that the focal point of the second collimating lens is located at the light source and adapted to collimate beams reflected by the second planar reflector into parallel beams to illuminate the test chart at the opening in the direction at −45° to the normal.

23. The test chart color measuring system according to claim 21, wherein the illuminator includes:
   a light source arranged on the normal to the opening;
   first and second concave reflectors arranged in symmetrical positions with respect to the normal passing through the light source and adapted to reflect and focus beams from the light source into parallel beams;
   wherein the first concave reflector is arranged such that reflected beams illuminate the test chart at the opening in the direction at +45° to the normal; and
   the second concave reflector is arranged such that reflected beams illuminate the test chart at the opening in the direction at −45° to the normal.

24. The test chart color measuring system according to claim 21, wherein the illuminator includes:
   a light source arranged on the normal to the opening;
   a plurality of planar mirrors arranged around the normal passing through the light source such that respective reflecting surfaces of the plurality of planar mirrors are substantially parallel to the normal and face the normal, and adapted to reflect beams from the light source; and
   a collimating lens arranged such that the focal point of the collimating lens is located at the light source and adapted to collimate beams reflected by the plurality of planar mirrors into parallel beams to illuminate the test chart at the opening in directions at 45° to the normal.

25. The test chart color measuring system according to claim 24,
   wherein the collimating lens is arranged such that the optical axis of the collimating lens coincides with the normal to the opening.

26. The test chart color measuring system according to claim 20, wherein the color image taking apparatus includes a drive controller which causes the color image pickup device to pick up images during a plurality of exposure periods different from each other, and the image processor calculates color values using image signals corresponding to exposure periods suitable for respective spectral sensitivities out of image signals obtained during the respective exposure periods.

27. The test chart color measuring system according to claim 19, wherein the image processor includes a display device, a display controller which controls the display device to display an index indicating a partial area of an image taken up by the color image taking apparatus together with the taken image, and calculates color values within the area indicated by the index.

28. A system for correcting a color output apparatus, comprising:
   a test chart output controller which controls a color output apparatus to output a test chart for correction in which specified color samples are respectively arrayed in sections divided in a matrix manner;
   a color image taking apparatus which simultaneously takes up a plurality of color images of the test chart to output image signals of a plurality of color components;
   an image processor which extracts image signals corresponding to color samples based on the density of the taken test chart image, and calculates a color value of each color sample using the extracted image signal; and
   a correction data calculator which calculates correction data for the color output apparatus based on respective color values of the color samples, wherein
      the color image taking apparatus has an optical system including a telecentric optical system that includes:
         a field lens arranged such that an optical axis of the field lens coincides with a normal to an opening at which the test chart is placed, and
         a focusing lens arranged at the focal point of the field lens.

29. A system for correcting a color output apparatus, comprising:
   a test chart output controller which controls a color output apparatus to output a test chart for correction in which specified color samples are respectively arrayed in sections divided in a matrix manner;
   a color image taking apparatus which takes up a color image of the test chart to output image signals of a plurality of color components;
   an image processor which extracts image signals corresponding to color samples based on the taken test chart image and information on section division, and calculates a color value of each color sample using the extracted image signal; and
   a correction data calculator which calculates correction data for the color output apparatus based on respective color values of the color samples, wherein
      the color image taking apparatus has an optical system including a telecentric optical system that includes:
         a field lens arranged such that an optical axis of the field lens coincides with a normal to an opening at which the test chart is placed, and
         a focusing lens arranged at the focal point of the field lens.

30. A system for correcting a color output apparatus, comprising:
   a test chart output controller which controls a color output apparatus to output a test chart for correction in which specified color samples are respectively arrayed in sections divided in a matrix manner;
   a color image taking apparatus which takes up a color image of the test chart to output image signals of a plurality of color components;
   an image processor which extracts image signals corresponding to color samples based on markers in the taken test chart image, and calculates a color value of each color sample using the extracted image signal; and
   a correction data calculator which calculates correction data for the color output apparatus based on respective color values of the color samples, wherein
      the color image taking apparatus has an optical system including a telecentric optical system that includes:
         a field lens arranged such that an optical axis of the field lens coincides with a normal to an opening at which the test chart is placed, and
         a focusing lens arranged at the focal point of the field lens.

* * * * *